(12) United States Patent
Ohnishi (10) Patent No.: US 8,644,120 B2
(45) Date of Patent: Feb. 4, 2014

(54) OPTICAL INFORMATION PROCESSING DEVICE AND TRACKING CONTROL METHOD THEREOF FOR USE WITH GROOVELESS MULTILAYER OPTICAL DISC

(75) Inventor: Kunikazu Ohnishi, Yokosuka (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 13/478,199

(22) Filed: May 23, 2012

(65) Prior Publication Data
US 2012/0300602 A1 Nov. 29, 2012

(30) Foreign Application Priority Data
May 26, 2011 (JP) .................................. 2011-117765

(51) Int. Cl.
*G11B 7/09* (2006.01)
*G11B 7/135* (2012.01)

(52) U.S. Cl.
USPC .................. 369/44.26; 369/44.37; 369/112.1

(58) Field of Classification Search
None
See application file for complete search history.

(56) References Cited

U.S. PATENT DOCUMENTS

| | | | | |
|---|---|---|---|---|
| 5,095,472 A | * | 3/1992 | Uchino et al. | 369/44.14 |
| 5,105,076 A | * | 4/1992 | Premji | 250/201.5 |
| 5,511,050 A | * | 4/1996 | Matsumoto et al. | 369/44.23 |
| 2008/0130458 A1 | * | 6/2008 | Shiono et al. | 369/94 |
| 2009/0147660 A1 | * | 6/2009 | Saito et al. | 369/112.23 |
| 2009/0262633 A1 | * | 10/2009 | Saito et al. | 369/112.23 |

FOREIGN PATENT DOCUMENTS

| | | | |
|---|---|---|---|
| JP | 01303632 A | * 12/1989 | ............... G11B 7/09 |
| JP | 2001-202637 | 7/2001 | |
| JP | 2003-67939 | 3/2003 | |
| JP | 2009-140568 | 6/2009 | |
| JP | 2010-97652 | 4/2010 | |
| JP | 2011-040130 | 2/2011 | |
| WO | WO 2010/004906 | 1/2010 | |

OTHER PUBLICATIONS

Office Action issued in Japanese Patent Application No. 2011-117765 on Jul. 9, 2013.
Office Action issued in Japanese Patent Application No. 2011-117765 on Nov. 12, 2013.

* cited by examiner

*Primary Examiner* — Hoa T Nguyen
*Assistant Examiner* — Mark Fischer
(74) *Attorney, Agent, or Firm* — Antonelli, Terry, Stout & Kraus, LLP.

(57) ABSTRACT

An optical information device used with a grooveless multilayer disc including multiple recording layers used to record and reproduce information signals and a guide layer dedicated to detect tracking error signals (TES) can always stably detect the TESs when the distance between the recording layer and guide layer varies due to selection of a target recording layer. For example, a plurality of light spots for detecting the TESs are formed by a holographic grating on the guide layer, but are defocused with respect to each other. The TESs are detected individually from the respective light spots. The TESs are subjected to an addition operation to be a signal for tracking control, thereby extraordinarily increasing the defocus dynamic range of the TESs.

4 Claims, 6 Drawing Sheets

OPTICAL INFORMATION PROCESSING DEVICE AND TRACKING CONTROL METHOD THEREOF FOR USE WITH GROOVELESS MULTILAYER OPTICAL DISC

INCORPORATION BY REFERENCE

This application relates to and claims priority from Japanese Patent Application No 2011-117765 filed on May 26, 2011, the entire disclosure of which is incorporated herein by reference.

BACKGROUND OF THE INVENTION (1) Field of the Invention

The present invention relates to optical information devices that optically record information signals on optical information recording media (hereinafter, referred to as optical discs) or reproduce information signals recorded on the optical discs, and more particularly, to an optical information processing device suitable for recording or reproduction of information signals on a multilayer optical disc with a plurality of recording layers stacked upon each other, and a tracking control method adopted by the optical information processing device.

(2) Description of the Related Art

Currently commercially available optical discs include, for example, DVDs with a storage capacity of 4.7 GB (Giga Byte) on one layer of one side and Blu-ray Discs having a larger storage capacity.

Recently proposed multilayer optical discs have, in addition to one or two information signal recording layers (hereinafter, the information signal recording layer is simply referred to as "recording layer", for clarity), a stack of three or more recording layers to increase the storage capacity. Such multilayer optical discs are rapidly proceeding toward standardization and practical utilization.

In order to achieve a large capacity multilayer optical disc, attention is being given to a so-called "grooveless multilayer disc" including a disc layer used exclusively for tracking control (hereinafter, the disc layer used exclusively for tracking control is simply referred to as "guide layer") in addition to the recording layers. The guide layer is used for detecting a tracking error signal that controls a light spot that is used for recording/reproduction and converged on a recording layer. Only the guide layer has a continuous guide groove formed thereon to detect the tracking error signal.

By the way, an optical pickup suitable for recording and reproduction of such a grooveless multilayer disc is disclosed, for example, in Japanese Patent Application Laid-Open No. 2003-067939 (PTL 1). The pickup in the disclosure adopts a tracking control method in which light beams are converged to form independent light spots on the recording layer and the guide layer, and tracking error signals are detected from the light spots converged on the guide layer (hereinafter, the light spots are referred to as "light converging spots G" for clarity) to perform tracking control of the light converging spots G based on the tracking error signals, while performing tracking control of a signal light spot converged on the recording layer (hereinafter, the light spot is referred to as "light converging spot R" for clarity) so as to follow the light converging spots G.

SUMMARY OF THE INVENTION

The optical pickup compatible with the grooveless multilayer disc of course needs to form the light converging spot G of diffraction limited size on the guide layer and the light converging spot R of diffraction limited size on a predetermined recording layer.

However, since a plurality of recording layers and guide layer are stacked upon each other and spaced a predetermined thickness apart to make up a single grooveless multilayer disc, the distance between the recording layer and guide layer varies according to which recording layer is targeted.

For example, an optical pickup as disclosed in PTL 1 is configured to converge light with a single objective lens to form both the light converging spots G and light converging spot R at a fixed interval therebetween along the optical axis. If the fixed distance between the light converging spots formed by the pickup is different from the distance between a target recording layer and the guide layer in an optical disc, the light converging spot R of diffraction limited size may be formed on the target recording layer, but the light converging spots G may not be focused to their diffraction limit on the guide layer and defocused, resulting in detection failure of tracking error signals.

In view of the problem, the present invention has an object to provide an optical information processing device including a simply configured optical system and being capable of always stably detecting tracking error signals for a grooveless multilayer optical disc in which the distance between the guide layer and recording layers varies according to which recording layer is targeted, a tracking control method used in the optical information processing device, and an optical pickup using the detection method to deal with the grooveless multilayer optical disc.

This object can be achieved by the present invention recited in the scope of the appended claims.

The present invention can provide an optical information processing device capable of always stably detecting tracking error signals for a grooveless multilayer optical disc in which the distance between the guide layer and recording layers varies according to the targeted recording layer, a tracking control method used in the optical information processing device, and an optical pickup compatible with the grooveless multilayer optical disc.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENT

With reference to the drawings, an embodiment of the present invention will be described.

Figure 1:
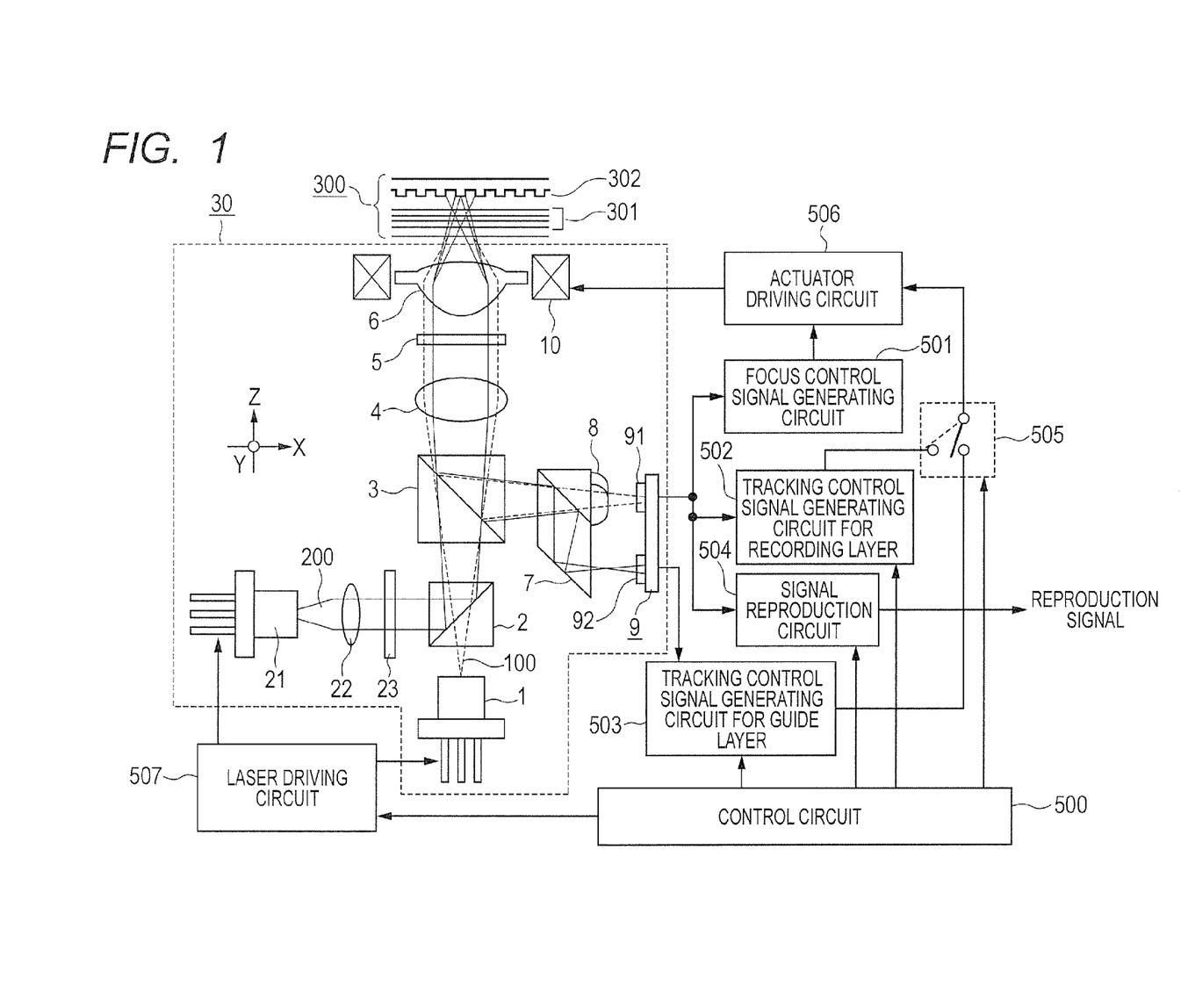
FIG. 1 is a schematic diagram and block diagram showing an embodiment of the optical information device according to the present invention.

FIG. 1 includes a schematic diagram and block diagram showing an embodiment of the optical information device of the present invention.

An optical pickup unit 30, which is one of the components making up the optical information device, includes a first semiconductor laser light source 1 for emitting a first light beam to be converged on a predetermined recording layer in a grooveless multilayer disc in order to write information signals or read out the written information signals and a second semiconductor laser light source 21 for emitting a second light beam to be converged and applied on a guide layer in the disc in order to detect a specific tracking error signal. The first light beam 100 (indicated by dashed lines in FIG. 1) emitted from the first semiconductor laser light source 1 successively passes through a wavelength-selective prism 2, a polarization beam splitter (PBS) 3, a coupling lens 4, a turning mirror (not shown), a quarter-wave plate 5 and some other optical elements and reaches an objective lens 6 that in turn converges the first light beam 100 on a predetermined recording layer in a recording layer group 301 provided in a grooveless multilayer optical disc 300.

This grooveless multilayer optical disc 300 is composed of the recording layer group 301 including a plurality of recording layers stacked upon each other with a predetermined layer spacing therebetween and a guide layer 302 that is positioned behind (upper side in FIG. 1) the recording layer group 301 and provided with a predetermined guide groove. The light beam 100 is converged on a predetermined recording layer in the recording layer group 301 by the objective lens 6 to form a light converging spot R.

On the other hand, the second light beam 200 (indicated by solid lines in FIG. 1) emitted from the second semiconductor laser light source 21 is dispersed by a given amount by an auxiliary lens 22 and then enters a holographic grating 23 that in turn splits the second light beam 200 into three light beams in total, namely a 0 order light beam passing through the grating 23 without suffering any diffraction and diffracted +1 order and −1 order light beams, and the diffracted light beams travel in predetermined directions, respectively.

During diffraction, the holographic grating 23 having a specific grating pattern of unequally-spaced curved grooves imparts positive and negative lens power conjugated to each other with respect to the 0 order light beam to the ±1 order diffracted light beams, respectively. One of the +1 and −1 order light beams is emitted in a relaxed dispersion state with respect to the 0 order light beam, while the other in an enhanced dispersion state.

After being diffracted and split by the holographic grating 23, the three light beams 200 are reflected off by the wavelength-selective prism 2 and are routed through almost the same optical path as the light beam 100 passing through, in other words, the light beams 200 pass through the PBS 3, coupling lens 4, turning mirror (not shown), and quarter-wave plate 5 in succession to reach the objective lens 6 that in turn converges the light beams 200 onto the grooveless multilayer optical disc 300 as does the light beam 100. The three light beams 200 respectively form three individual light converging spots G on the guide layer 302 in the disc 300.

Detailed descriptions about the light converging spots R and G will be given later.

After forming the light converging spots R and G on the predetermined recording layer and guide layer in the recording layer group 301 of the optical disc 300, the light beams 100, 200 are reflected off by the respective disc layers to become returning light beams that then enter the objective lens 6 again. Subsequently, the returning beams are routed through almost the same optical path as the advancing light beams having passed through, and then enter the PBS 3 that in turn reflects the returning light beams to direct them to a compound prism 7. The compound prism 7 including a wavelength-selective mirror face that splits the returning light beams into the returning light beam from the light converging spot R and the returning light beams from light converging spots G and directs them to different optical paths.

Among the light beams, the returning light beam from the light converging spot R passes through the wavelength-selective mirror face and enters a detection face 91 in the photodetector 9 via a cylindrical lens 8 that introduces a predetermined amount of astigmatism to the light beam.

Note that the astigmatism introduced by the cylindrical lens 8 will be used to generate a focus control signal from a detection signal obtained by the detection face 91 based on an astigmatic method, which will be described later.

Among the light beams, the returning light beams from the light converging spots G are reflected off by the wavelength-selective mirror face and further reflected off by a reflecting face for changing the optical path. Subsequently, the returning light beams enter a detection face 92 separately disposed from the detection face 91 in the photodetector 9.

The configuration of the detection faces 91 and 92 in the photodetector 9 and the specifics of the signal detection method will be described later.

A signal detected by the detection face 91 is fed to a focus control signal generating circuit 501, a recording-layer tracking error signal generating circuit 502 and a signal reproduction circuit 504.

A signal detected by the detection face 92 is fed to a guide-layer tracking error signal generating circuit 503.

The focus control signal generating circuit 501 generates a focus control signal that is then converted into a focus actuator driving signal by an actuator driving circuit 506. The focus actuator driving signal is fed to a lens actuator 10 provided to drive the objective lens 6 two-dimensionally, thereby controlling the focus of the objective lens 6.

The recording-layer tracking error signal generating circuit 502 generates a first tracking error signal that is used to read out an information signal that has been already written in the recording layer. As with the case of the focus control signal, the first tracking error signal is converted into a tracking actuator driving signal in the actuator driving circuit 506 and then fed to the lens actuator 10 to perform tracking drive control of the objective lens 6. This tracking control allows the light converging spot R to properly trace recording tracks composed of information signal arrays on the recording layer. As a result, the recorded information signals are correctly detected and output as reproduced signals by the signal reproduction circuit 504.

On the other hand, the guide-layer tracking error signal generating circuit 503 generates a second tracking error signal that is used to write a new information signal on an empty recording layer.

As described above, the light converging spots G and light converging spot R are formed by converging light beams by a single objective lens 6 onto the guide layer 302 and the predetermined recording layer of the recording layer group 301 in the optical disc 300.

In short, the second tracking error signal generated by the guide-layer tracking error signal generating circuit 503 is fed to the actuator driving circuit 506 to convert it into a tracking actuator driving signal and is then fed to the lens actuator 10 to perform tracking drive control of the objective lens 6, thereby performing tracking control of the light converging spots G formed on the guide layer in the optical disc. Following the light converging spots G enables simultaneous tracking control of the light converging spot R converged on the recording layer.

The tracking error signal to be fed to the actuator driving circuit 506 is selectively switched between the first and second tracking error signals by a switch circuit 505.

The output power of the laser light source 1 for recording layers and the laser light source 21 for the guide layer is controlled by a laser driving circuit 507 based on laser output monitoring signals obtained from a laser output monitor (not shown).

The operations of the focus control signal generating circuit 501, recording-layer tracking error signal generating circuit 502, guide-layer tracking error signal generating circuit 503, signal reproduction circuit 504, switch circuit 505, laser driving circuit 507 and some other components are always controlled by a given control circuit 500.

Figure 2:
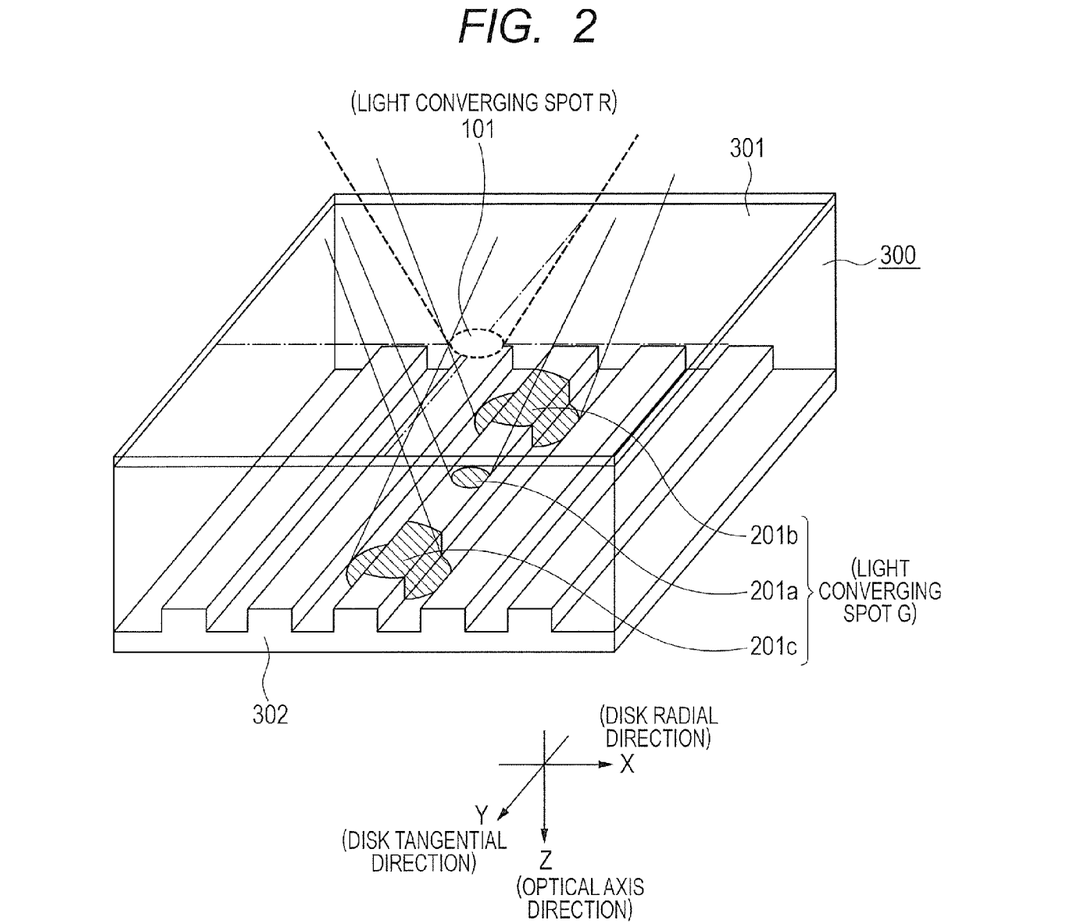
FIG. 2 is a schematic perspective view showing a simply depicted configuration of a grooveless multilayer optical disc and an example of light converging spots applied on the optical disc according to the present invention.

Referring to FIG. 2, the states of the light converging spots R and G formed on layers in the multilayer optical disc 300 will be described.

FIG. 2 is a schematic perspective view showing an example of a specific structure of the grooveless multilayer disc and an example of states of the light converging spots R and G formed on the disc.

In FIG. 2, like components are denoted by like numerals as of FIG. 1. Note that the disc is flipped vertically with respect to that in FIG. 1 for clarity.

Actually, the grooveless multilayer disc 300 includes a recording layer group 301 composed of a plurality of recording layers stacked upon each other with a predetermined layer spacing therebetween and a guide layer 302 with a predetermined guide groove or pit arrays arranged at predetermined intervals in a radial direction (X-axis direction) of the disc and extending in a tangential direction (Y-axis direction); however, for clarity, FIG. 2 shows only one recording layer extracted from the middle of the plurality of recording layers making up the recording layer group 301 and represents the recording layer as a recording layer 301.

A first laser light beam 100 emitted from the semiconductor laser light source 1 travels through the predetermined forward optical path and then is converged by the objective lens 6 on the recording layer 301 in the multilayer optical disc 300 to form a light converging spot 101. This light converging spot 101 corresponds to the light converging spot R.

On the other hand, a second laser light beam 200 emitted from the semiconductor laser light source 21 is split by the holographic grating 23 into three light beams, a 0 order light beam and ±1 order diffracted light beams as described above. The split light beams travel through the predetermined forward optical path and then enter the objective lens 6 that in turn converges the beams on the guide layer 302 in the multilayer optical disc 300 to form three light converging spots 201*a*, 201*b*, 201*c*. These three light converging spots 201*a*, 201*b*, 201*c* correspond to the light converging spots G.

The three light converging spots 201*a*, 201*b*, 201*c* are light converging spots derived from the light beams diffracted and split by the aforementioned holographic grating 23. Among the three, the middle light converging spot 201*a* is a light converging spot derived from the 0 order light beam having passed through the holographic grating 23 without being diffracted. The light converging spots 201*b*, 201*c*, which are located so as to sandwich the light converging spot 201*a* from the front and back along the guide groove on the guide layer 20, are light converging spots derived from the ±1 order diffracted light beams, respectively, diffracted and split by the holographic grating 23. The light converging spots 201*b*, 201*c* are defocused by a predetermined amount in an opposite direction to each other with respect to the middle light converging spot 201*a* along the optical axis direction (Z-axis direction in FIG. 2).

In other words, the light converging spots 201*b*, 201*c* have their diffraction limit within a plane (Y-Z plane) formed in the optical axis direction (Z-axis direction in FIG. 2) and the tangential direction (Y-axis direction in FIG. 2) of the disc and at positions at almost the same distance apart in an opposite direction from the diffraction limited position (position where the smallest light converging spot is formed) of the light converging spot 201*a* as a center.

As shown in FIG. 2, the relative distance between the light converging spot 101 and light converging spot 201*a* is adjusted so that, when the diffraction limit of the light converging spot 101 is positioned just on the recording layer 301 (hereinafter, this state is referred to as "just focus"), the diffraction limit of the light converging spot 201*a* is concurrently positioned on the guide layer 302. This adjustment automatically permits the light converging spots 201*b* and 201*c* to be applied on the guide layer 302 with a predetermined amount of defocus in the opposite direction to each other.

The example in FIG. 2 shows the light converging spots 201*a*, 201*b*, 201*c* equidistantly formed along the direction of the guide groove of the guide layer 302, or in the tangential direction (Y-axis direction in FIG. 2) of the disc; however, the present invention is not limited thereto.

As long as the light converging spots 201*a*, 201*b*, 201*c* are not formed on top of each other, the spots can be formed anywhere on the guide layer 302.

In addition, the number of the light converging spots G formed on the guide layer according to the present invention is not limited to three as shown in the embodiment of FIGS. 1 and 2. For example, with a holographic grating 23 having a predetermined diffraction efficiency obtained by modifying the cross-sectional shape of the grating grooves of the grating 23, not only the ±1 order diffracted light beams, but also higher order diffracted light beams can be obtained from the second light beam 200. There is no problem to increase the number of the light converging spots G formed on the guide layer 302, to five, seven, nine or more.

In addition, the optical element to form the plurality of light converging spots G is not limited to the holographic grating as shown in FIG. 1. Any optical elements can be used as long as the optical elements have the ability to form the light converging spots on the guide layer that are defocused with respect to each other by a predetermined amount in the optical axis direction.

Furthermore, FIG. 2 shows the example in which the guide layer 302 includes a continuous guide groove with a given space between adjacent groove parts along the radial direction (X-axis direction) of the disc; however, the present invention is not limited thereto. There is no problem to use a guide layer 302 including, for example, predetermined pit arrays rather than the aforementioned continuous guide groove.

Figure 3A:
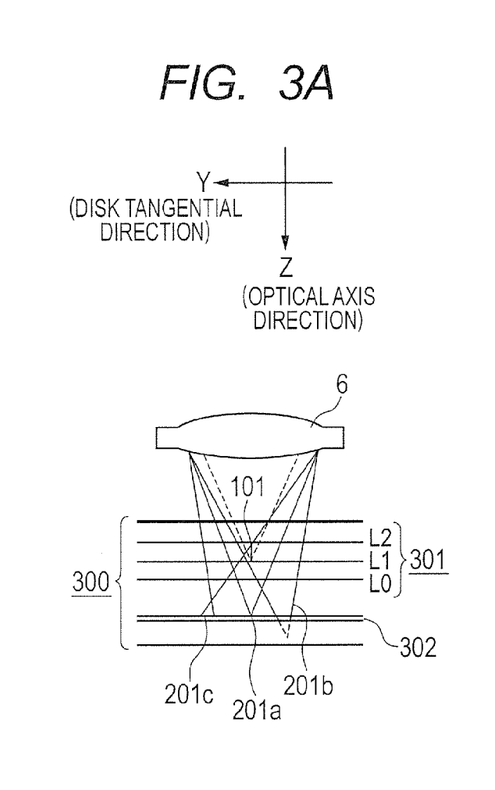
FIG. 3A is the first schematic cross-sectional view of a relevant disc part to show the state of light spots formed by converging light beams on respective layers of the grooveless multilayer optical disc, as an example.
Figure 3B:
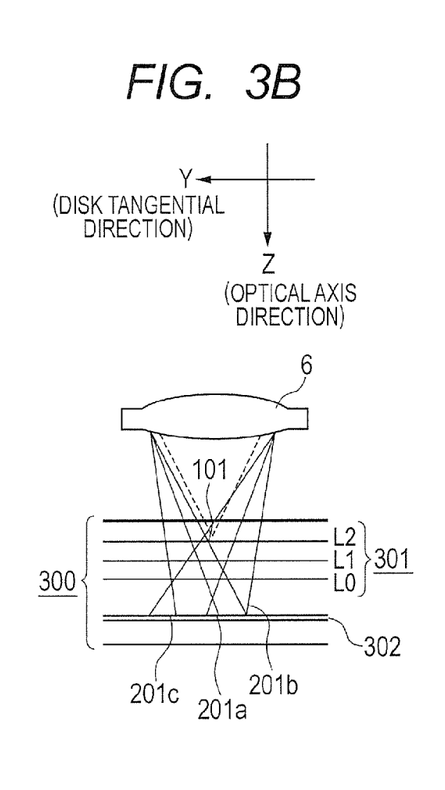
FIG. 3B is the second schematic cross-sectional view of a relevant disc part to show the state of light spots formed by converging light beams on respective layers of the grooveless multilayer optical disc, as an example.
Figure 3C:
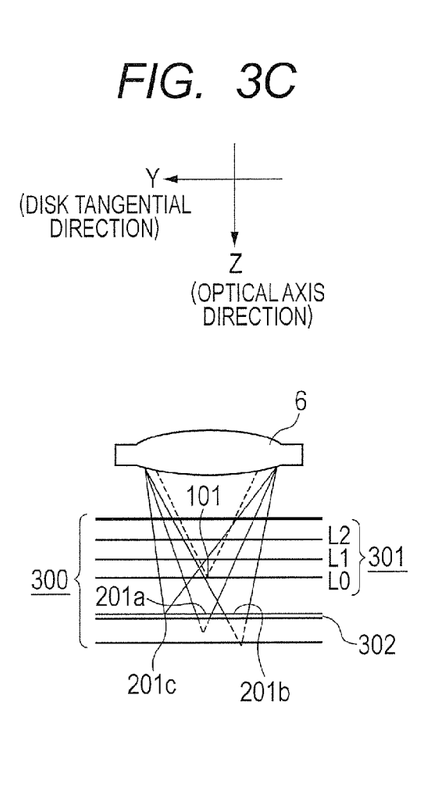
FIG. 3C is the third schematic cross-sectional view of a relevant disc part to show the state of light spots formed by converging light beams on respective layers of the grooveless multilayer optical disc, as an example.

FIGS. 3A to 3C are schematic cross-sectional views of relevant disc parts to show the state of light spots converged on the respective layers, more particularly the state of a light converging spot 101 for recording layers formed on a predetermined recording layer in the recording layer group 301 of the multilayer optical disc and three light converging spots for the guide layer, namely the light converging spots 201a, 201b, 201c formed on the guide layer 302, as the example shown in FIG. 2.

For the sake of clarity, FIGS. 3A to 3C show a recording layer group 301 with three recording layers L0, L1, L2 located in this order from the furthest with respect to the objective lens 6; however, the present invention does not of course limit the number of the stacked recording layers. There is no problem to apply the invention to optical discs including four or more recording layers.

As with the case of FIG. 2, FIGS. 3A to 3C also show discs flipped vertically with respect to that in FIG. 1.

FIG. 3A replicates the state of the light converging spots described with FIG. 2. Specifically, the recording-layer light converging spot 101 is just focused on a recording layer L1 in the middle of the recording layer group 301, while a light converging spot 201a in the middle of the three guide-layer light converging spots 201a, 201b, 201c is mostly just focused on the guide layer 302. The other guide-layer light converging spots 201b and 201c strike the guide layer 302, but are defocused by a predetermined amount. More specifically, the diffraction limit of the converged light 201b is positioned further (lower side in FIG. 3A) than the guide layer 302 from the objective lens 6, and the diffraction limit of the converged light 201c is positioned closer (upper side in FIG. 3A) than the guide layer 302 to the objective lens 6.

FIG. 3B shows an example in which the recording-layer light converging spot 101 is just focused on the recording layer L2 which is the closest (top recording layer in FIG. 3B) to the objective lens 6 in the recording layer group 301. In this case, among the three guide-layer light converging spots 201a, 201b, 201c, the right converging spot 201b is mostly just focused on the guide layer 302. The other guide-layer light converging spots 201a and 201c strike the guide layer 302, but are defocused by a predetermined amount so that the diffraction limits of both the light converging spots 201a and 201c are positioned closer (upper side in FIG. 3B) than the guide layer 302 to the objective lens 6.

FIG. 3C shows an example in which the recording-layer light converging spot 101 is just focused on the recording layer L0 which is the furthest (lowest recording layer in FIG. 3C) from the objective lens 6 in the recording layer group 301. In this case, among the three light converging spots 201a, 201b, 201c in FIG. 3C, the left light converging spot 201c is mostly just focused on the guide layer 302. The other guide-layer light converging spots 201a and 201b strike the guide layer 302, but are defocused by a predetermined amount so that the diffraction limits of both the light converging spots 201a and 201b are positioned further (lower side in FIG. 3C) than the guide layer 302 from the objective lens 6.

Figure 4:
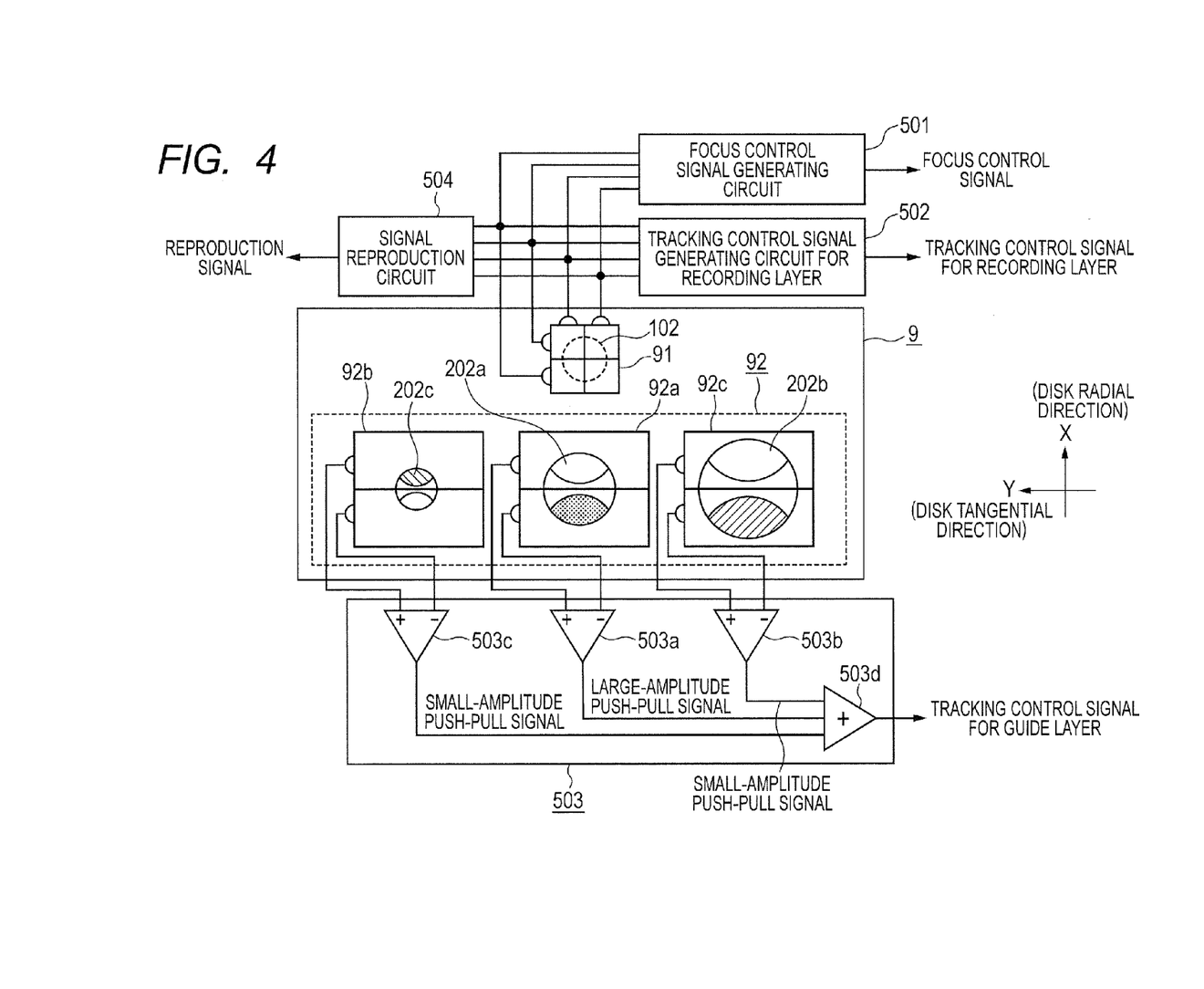
FIG. 4 includes a schematic plan view and block diagram showing an exemplary configuration of a photodetector and various kinds of control signal detection circuits according to the present invention and exemplary states of detected light spots formed on detection faces and the detection signals.
Figure 5:
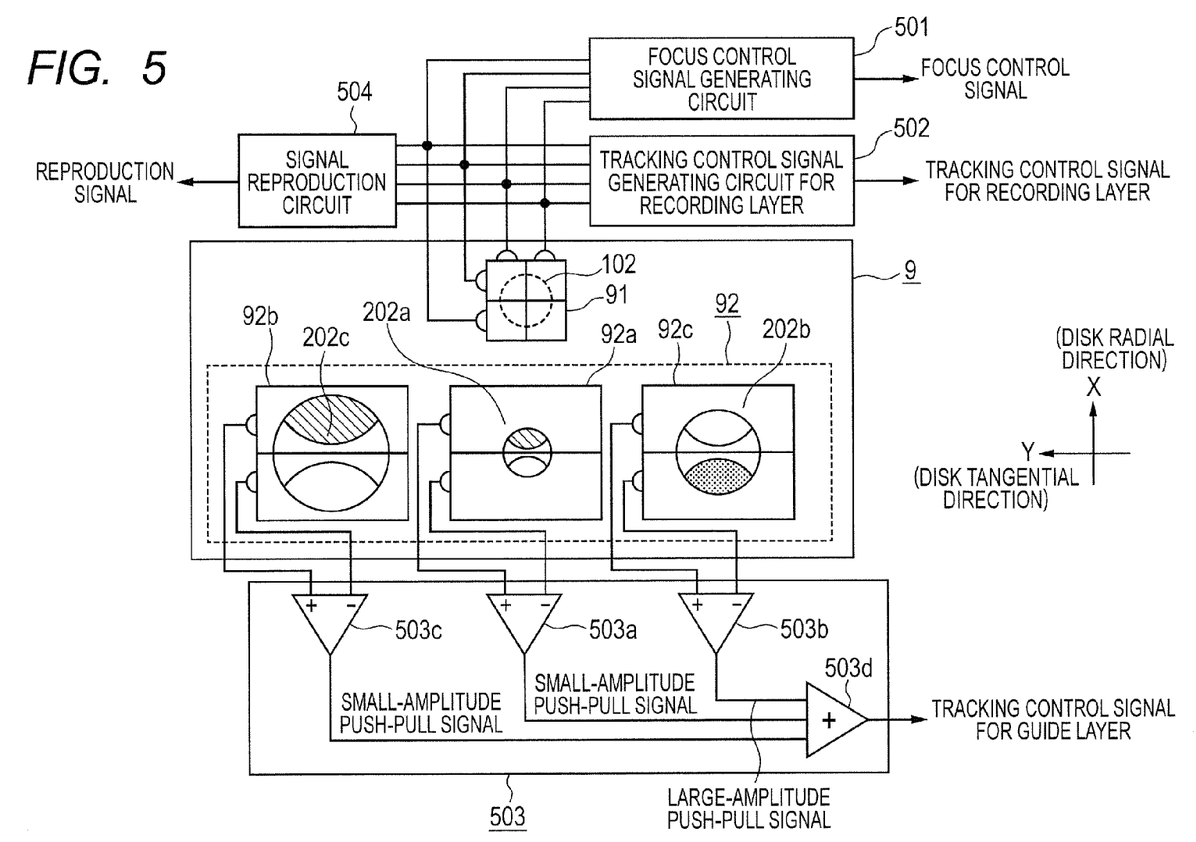
FIG. 5 includes a schematic plan view and block diagram showing an exemplary configuration of the photodetector and various kinds of control signal detection circuits according to the present invention, and other exemplary states of detected light spots formed on detection faces and the detection signals.
Figure 6:
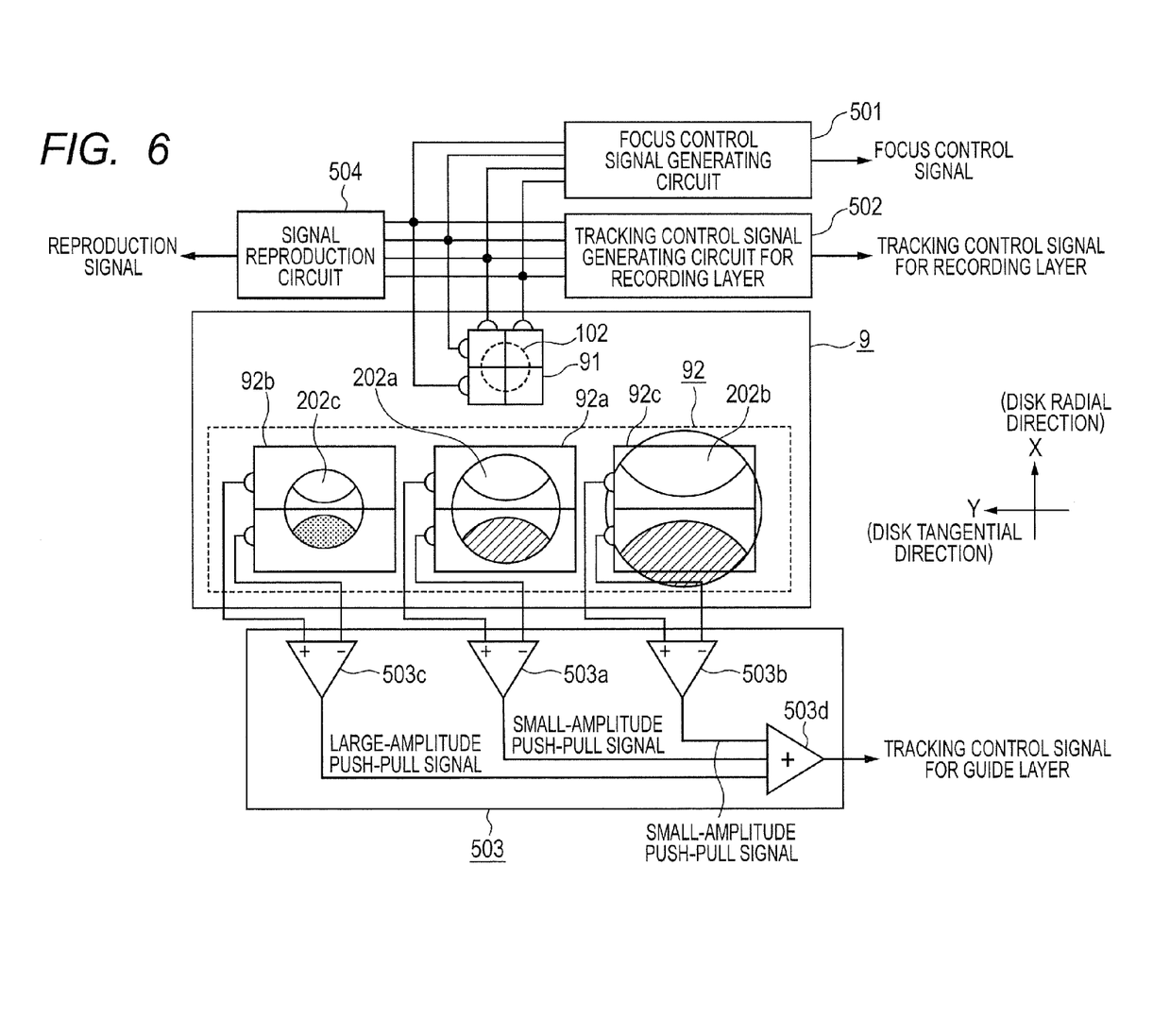
FIG. 6 includes a schematic plan view and block diagram showing an exemplary configuration of the photodetector and various kinds of control signal detection circuits according to the present invention, and yet other exemplary states of detected light spots formed on detection faces and the detection signals.

FIGS. 4, 5 and 6 are schematic plan views showing the configuration of the photodetector 9 disposed in the optical pickup 30. FIGS. 4, 5 and 6 also show a relevant optical pickup part to explain how the detection faces in the photodetector 9 are irradiated with light beams and what kind of signals are detected by the photodetector 9 according to the states where the light converging spots are formed on the multilayer optical disc 300 as shown in FIGS. 3A to 3C.

Through FIGS. 4 to 6, like components are denoted by like numerals as of FIG. 1.

The photodetector 9 includes a photodetection face 91 on which a light beam reflected from the light converging spot 101 formed on the recording layer of the disc is converged as a returning light beam 102 and a photodetection face 92 composed of three independent photodetection faces 92a, 92b, 92c on which light beams reflected from the light converging spots 201a, 201b, 201c formed on the guide layer are converged as returning light beams 202a, 202b, 202c, respectively.

The photodetection face 91 is, for example, divided into four quadrants by crossed parting lines as shown in the FIGS. 4 to 6. Detection signals respectively obtained from the divided detection faces are supplied to a focus control signal generating circuit 501, recording-layer tracking error signal generating circuit 502 and signal reproduction circuit 504.

The detection signal supplied to the focus control signal generating circuit 501 is converted into a focus control signal by an astigmatic method. This control signal is output to adjust the focus of the objective lens 6.

The tracking error signal generating circuit 502 outputs a tracking error signal (DPD signal) converted by a differential phase detection (DPD) method. This DPD signal is used to perform tracking control of the objective lens 6 to reproduce the recording layer.

The signal reproduction circuit 504 outputs a reproduced signal from the recorded recording layer.

The method of detecting the focusing and tracking error signals, the method of reproducing the recorded information signals and detection principle thereof are well known in the art, and therefore detailed descriptions thereof are not reiterated.

The present invention does not limit the method of detecting the focus control signals and tracking error signals to the aforementioned astigmatic method and DPD method.

When a new information signal is written in an empty recording layer, signals detected on the photodetection face 92 are fed to the guide-layer tracking error signal generating circuit 503 that in turn generates a tracking signal of the light converging spots for the guide layer. The tracking signal is used to perform tracking control of the objective lens 6.

Each of the three independent photodetection faces 92a, 92b, 92c, which make up the photodetection face 92, is divided into two, an upper segment and a lower segment as in FIGS. 4 to 6, by a straight parting line extending roughly along a direction (Y-axis direction in FIGS. 4 to 6) corresponding to the tangential direction of the optical disc. Signals from the respective two segments undergo a subtraction operation by subtractors 503a, 503b, 503c in the guide-layer tracking error signal generating circuit 503. Thus, independent tracking error signals (push-pull signals) are obtained by a push-pull method from returning light beams 202a, 202b, 202c respectively corresponding to the guide-layer light converging spots 201a, 201b, 201c. The method of detecting the tracking error signals with the push-pull method and principle thereof are well known in the art and will not be described in detail.

As described above, in FIG. 3A, only the middle light converging spot 201a is mostly just focused on the guide layer 302, while the other light converging spots are defocused by a predetermined amount. In FIG. 4, the returning light beam 202a corresponding to the light converging spot 201a enters the photodetection face 92a and results in a push-pull signal of the largest amplitude and high quality.

On the other hand, push-pull signals obtained by the other photodetection faces 92b, 92c have extremely small amplitude in comparison with the push-pull signal obtained by the photodetection face 92a.

When these push-pull signals undergo an addition operation in an adder 503d, the resultant signal becomes a tracking error signal of as good a quality as the push-pull signal obtained by the photodetection face 92a. Using the signal subjected to the addition operation enables proper tracking control of the objective lens 6.

FIG. 5 shows the state of the photodetector 9 when only the right light converging spot 201b is mostly just focused on the guide layer 302 as shown in FIG. 3B. In this case, the returning light beam 202b corresponding to the light converging spot 201b enters the photodetection face 92c and results in a push-pull signal of the largest amplitude and high quality. As with the case shown in FIG. 4, push-pull signals obtained by the other photodetection faces 92a, 92b have extremely small amplitude in comparison with the push-pull signal obtained by the photodetection face 92c.

When these push-pull signals undergo an addition operation in the adder 503d, the resultant signal becomes a tracking error signal of as good a quality as the push-pull signal obtained by the photodetection face 92c. Thus, as with the case shown in FIG. 4, using the signal subjected to the addition operation enables proper tracking control of the objective lens 6.

The same thing as FIGS. 4 and 5 can be applied to FIG. 6. Specifically, FIG. 6 shows the state of the photodetector 9 when only the left light converging spot 201c is mostly just focused on the guide layer 302 as shown in FIG. 3C. In this case, the returning light beam 202c corresponding to the light converging spot 201c enters the photodetection face 92b and results in a high quality push-pull signal of the largest amplitude. As with the case shown in FIG. 4, push-pull signals obtained by the other photodetection faces 92a, 92c have extremely small amplitude in comparison with the push-pull signal obtained by the photodetection face 92b.

When these push-pull signals undergo an addition operation in the adder 503d, the resultant signal becomes a tracking error signal of as good a quality as the push-pull signal obtained by the photodetection face 92b. Thus, as with the case shown in FIG. 4, using the signal subjected to the addition operation enables proper tracking control of the objective lens 6.

As described above, whatever recording layer in the recording layer group 301 the light converging spot 101 is just focused on, a good tracking error signal can be constantly detected from the guide-layer light converging spot formed on the guide layer 302. Performing the tracking control of the objective lens 6 with the tracking error signal allows proper tracking control of both the light converging spot 101 for recording layers and light converging spots for the guide layer.

The embodiment described with FIGS. 3A to 3C and FIGS. 4 to 6 indicates an example in which at least one of the light converging spots to be formed on the guide layer 302 is just focused on the guide layer 302 whatever recording layer in the recording layer group 301 the recording-layer light converging spot 101 is just focused; however, the present invention is not limited thereto.

There is a possible case where the number of the recording layers is greater than the number of the light spots to be converged on the guide layer. In this case, when a recording-layer light converging spot 101 is just focused on a predetermined recording layer, none of the guide-layer light converging spots may be just focused on the guide layer. However, as shown in FIGS. 4 to 6, adding up the push-pull signals obtained from the respective light converging spots for the guide layer brings a signal almost equal to the high quality push-pull signal having the largest amplitude among the signals, thereby constantly providing a good tracking error signal.

In addition, the present invention is not limited to the method of adding up the push-pull signals obtained from the respective guide-layer light converging spots.

There is no problem of not performing the addition operation on purpose. One of the possible methods includes individually monitoring push-pull signals obtained from guide-layer light converging spots and choosing a high quality push-pull signal of the largest amplitude when needed to use it as a tracking error signal.

The embodiment shown in FIG. 1 and FIGS. 4 to 6 shows an example in which the tracking error signal is detected from the guide-layer light converging spots by the push-pull method; however, the present invention is of course not limited thereto. There is no problem of adopting other well-known focusing and tracking error signal detection methods.

For example, provision of predetermined pit arrays to the guide layer 302, instead of the continuous guide groove, allows detection of tracking error signals from the guide-layer light converging spots 201a, 201b, 201c by the DPD method as with the case of the recording-layer light converging spot 101. The DPD method can advantageously avoid tracking error signal offset caused by objective lens displacement when using the push-pull method.

Even when using the DPD method, adding up DPD signals obtained from the guide-layer light converging spots or choosing one DPD signal as described above enables constant proper tracking control whatever recording layer the light converging spot is just focused on among the plurality of recording layers.

Furthermore, the present invention is not limited to the optical information device with the configuration shown in FIG. 1. As long as the optical information device is configured to form light spots, which are defocused with respect to each other along the optical axis direction, on a guide layer in a grooveless multilayer optical disc to detect independent tracking error signals respectively from the guide-layer light converging spots, the invention can be applied to any types of optical information devices.

While we have shown and described an embodiment in accordance with our invention, it should be understood that the disclosed embodiment is susceptible of changes and modifications without departing from the scope of the invention. Therefore, we do not intend to be bound by the details shown and described herein but intend to cover all such changes and modifications that fall within the ambit of the appended claims.

What is claimed is:

1. An optical information processing device compatible with an optical disc, as a recording medium, including at least three recording layers and a guide layer with a predetermined guide groove or pit arrays formed thereon, the optical information processing device comprising:

a first light source generating a first light beam used to reproduce an information signal recorded on the recording layers or to record an information signal on the recording layers;

a second light source generating a second light beam used to detect the guide groove or pit arrays provided on the guide layer;

an optical element irradiated with the second light beam and splitting the second light beam into at least two light beams to form their light converging spots at positions a predetermined distance which is exclusive of zero away from each other in an optical axis direction;

an objective lens irradiated with the first light beam and the light beams split from the second light beam by the optical element, converging the first light beam on any one of the at least three of recording layers, and applying the light beams split from the second light beam by the optical element on the guide layer;

a photodetector separately detecting a first reflected light beam of the first light beam, the first reflected light beam coming from a recording layer of the at least three recording layers, and a second reflected light beam containing at the least two reflected light beams of the light beams split from the second light beam by the optical element, the at least two reflected light beams coming from the guide layer;

a focus control signal generating circuit generating a focus control signal for controlling a focus position of the objective lens relative to the recording layer relating to the first light beam based on detection signals detected by the photodetector, the detection signals being detected from the first reflected light beam from the recording layer;

a signal reproducing circuit performing reproduction processing of the information signal recorded on the recording layer based on the detection signals detected by the photodetector from the first reflected light beam; and a tracking control signal generating circuit generating a tracking control signal for controlling the tracking position of the objective lens relative to the recording layer based on detection signals detected by the photodetector, the detection signals being detected from the at least two reflected light beams from the guide layer, wherein the tracking control signal generating circuit is adapted to select one light beam of the at least two reflected light beams, of which amplitude of a predetermined signal detected from each of the split at least two second reflected light beams detected by the photodetector is maximum out of the at least two reflected light beams, to generate the tracking control signal for controlling the tracking position of the objective lens relative to one recording layer of the at least three recording layers based on the detection signal detected from the selected light beam, and to generate the tracking control signal for controlling the tracking position of the objective lens relating to another recording layer of the at least three recording layers, which is adjacent to the one recording layer, based on the detection signal detected from another light beam of the at least two reflected light beams, which is different from the selected light beam.

2. The optical information processing device according to claim 1, wherein the tracking error signal generating circuit is adapted to control the tracking position of the objective lens relative to the recording layer by adding a plurality of detection signals obtained from light beams detected by the photodetector, the light beams being obtained by splitting the second light beam by the optical element.

3. The optical information processing device according to claim 1, wherein the optical element is a holographic grating with a grating pattern of unequally-spaced curved grooves.

4. The optical information processing device according to claim 3, wherein the light beams split by the optical element are 0 order light (transmitted light), +1 order diffracted light and −1 order diffracted light of the second light beam.

\* \* \* \* \*